(12) United States Patent
Baker (10) Patent No.: US 9,307,227 B2
(45) Date of Patent: Apr. 5, 2016

(54) STEREOSCOPIC IMAGE REGISTRATION AND COLOR BALANCE EVALUATION DISPLAY

(75) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 1130 days.

(21) Appl. No.: 13/208,583

(22) Filed: Aug. 12, 2011

(65) Prior Publication Data

US 2012/0218391 A1     Aug. 30, 2012

Related U.S. Application Data

(60) Provisional application No. 61/446,170, filed on Feb. 24, 2011.

(51) Int. Cl.
*H04N 13/02*     (2006.01)
*H04N 13/00*     (2006.01)

(52) U.S. Cl.
CPC ....... *H04N 13/0246* (2013.01); *H04N 13/0018* (2013.01)

(58) Field of Classification Search
CPC   H04N 13/0246; H04N 13/0018; H04N 17/02
USPC .......................... 348/51, 46, 42, 47, 180, 187
See application file for complete search history.

(56) References Cited

U.S. PATENT DOCUMENTS

| | | | |
|---|---|---|---|
| 4,648,113 A * | 3/1987 | Horn et al. ........................ 381/1 |
| 5,038,098 A * | 8/1991 | Birkel et al. ............... 324/121 R |
| 5,307,087 A | 4/1994 | Baker |
| 5,861,891 A * | 1/1999 | Becker .......................... 345/619 |
| 6,111,596 A * | 8/2000 | Haskell et al. .................. 348/42 |
| 6,571,255 B1 * | 5/2003 | Gonsalves et al. |
| 6,621,571 B1 * | 9/2003 | Maeda et al. .............. 356/237.5 |
| 6,687,400 B1 * | 2/2004 | Szeliski ........................ 382/168 |
| 6,724,423 B1 * | 4/2004 | Sudo ............................. 348/188 |
| 6,947,587 B1 * | 9/2005 | Maeda et al. ................. 382/149 |
| 7,057,768 B2 * | 6/2006 | Zaklika et al. ................ 358/1.9 |
| 7,162,074 B2 * | 1/2007 | Shibayama ................... 382/154 |
| 7,680,325 B2 * | 3/2010 | Miwa et al. .................. 382/167 |

(Continued)

FOREIGN PATENT DOCUMENTS

CN         1788486 A1    6/2006
CN    101588439 A1    11/2009

(Continued)

OTHER PUBLICATIONS

EP Search Report for European Patent No. 12156924.8 dated Apr. 6, 2012, 6 pages.

*Primary Examiner* — David Harvey
(74) *Attorney, Agent, or Firm* — Marger Johnson; Michael A. Nelson (57) ABSTRACT

A method of generating a stereoscopic image registration and color balance evaluation display enables a user to align two cameras used to produce a stereoscopic video signal or to analyze a received stereoscopic video signal. Left and right images from the cameras are converted into desired video signal components. Corresponding pixels from the left and right images are compared for each of the video signal components, and plotted as x and y inputs to a Cartesian plot to produce respective two-dimensional (2D) histograms. The multiple 2D histograms are presented as a Quad Diamond display so a user may align the two cameras or analyze the received stereoscopic video signal.

16 Claims, 6 Drawing Sheets

(56) References Cited

U.S. PATENT DOCUMENTS

| | | |
|---|---|---|
| 7,796,812 B2 * | 9/2010 | Pitie et al. .................... 382/162 |
| 8,098,276 B2 * | 1/2012 | Chang et al. .................... 348/43 |
| 8,427,504 B2 * | 4/2013 | Witt et al. .................... 345/629 |
| 2003/0095178 A1 * | 5/2003 | Shibayama .................... 348/46 |
| 2006/0204104 A1 * | 9/2006 | Liu et al. .................... 382/194 |
| 2009/0015689 A1 * | 1/2009 | Murayama ................ 348/229.1 |
| 2009/0153745 A1 | 6/2009 | Park et al. |
| 2011/0037829 A1 * | 2/2011 | Hata .............................. 348/43 |
| 2012/0050474 A1 * | 3/2012 | Segall ............................ 348/43 |
| 2012/0206475 A1 * | 8/2012 | Bryant et al. ................. 345/589 |
| 2013/0002810 A1 * | 1/2013 | Stauder et al. .................. 348/42 |

FOREIGN PATENT DOCUMENTS

| | | |
|---|---|---|
| JP | 2008244996 A * | 10/2008 |
| WO | 2005112433 A1 | 11/2005 |
| WO | 2007007924 A1 | 1/2007 |
| WO | WO 2008/080185 A2 * | 7/2008 |

* cited by examiner

STEREOSCOPIC IMAGE REGISTRATION AND COLOR BALANCE EVALUATION DISPLAY

CROSS-REFERENCE TO RELATED APPLICATION

This non-provisional patent application claims the priority filing date of provisional U.S. Patent Application Ser. No. 61/446,170 filed Feb. 24, 2011 entitled "Stereoscopic Image Registration and Color Balance Evaluation Display", which is hereby incorporated by reference.

FIELD OF THE INVENTION

The present invention relates to video test and measurement instruments, and more particularly to methods for assessing the image registration and color balance of three-dimensional (3D) images.

BACKGROUND OF THE INVENTION

Today, live field production of 3D stereoscopic images typically requires a two-camera rig using image splitting to produce two images—a left image and a right image. The two cameras must be setup and registered to each other to eliminate geometric or spatial mismatches, such as 1) vertical deviation, 2) angle deviation (other than desired parallax), 3) rotation error, 4) zoom or focal length mismatch, and 5) scene composition. Also, it is required that the two cameras be adjusted to mitigate mismatches in 6) brightness/contrast (aperture or gain) and color balance between the cameras or imagers as well as temporal mistiming.

Adjusting the cameras to match and eliminate one or more of these differences is currently done by such methods as: a) looking at a picture monitor of a split screen of the two images for side-by-side comparison; b) using a checkerboard pattern where adjacent squares are alternately switched between the left and right images to facilitate matching on a single picture, or c) using a waveform monitor or vector display to precisely match signal levels and color balance of the two cameras to mitigate the mismatching in brightness/contrast and color balance.

U.S. Pat. No. 5,307,087, issued to Daniel G. Baker on Apr. 26, 1994 entitled "Three-Dimensional RGB Component Vector Display", provides a three-dimensional display for a standard two-dimensional video display by combining two pairs of combination signals, such as green and blue components and green and red components. The two combination signals are input alternately to the inputs of a vector display device to provide a symmetrical display about an axis of symmetry, where one-half characterizes the blue component, the other half characterizes the red component, and both halves characterize the green component. The resulting "Diamond" display includes a graticule for each half to define a color gamut region for the three color components so a user can see whether a color video signal represents a valid color space in RGB.

What is desired is a method and display that is easy to use and understand that allows precise matching of signal levels due to camera color balance, aperture (gain) and timing mismatch between left and right images so a user may readily provide stereoscopic image registration and color balance evaluation for stereoscopic images produced by a two-camera stereoscopic system. It also should provide indication of optimal geometric alignment so any mismatch may be nullified by adjusting relative left and right camera tilt, rotation and zoom without reference to particular image segments on a picture display.

BRIEF SUMMARY OF THE INVENTION

Accordingly, the present invention provides a stereoscopic image registration and color balance evaluation display to enable a user to align cameras used to produce a quality stereoscopic video signal, or alternatively to analyze the quality of a received stereoscopic video signal. The cameras produce respectively a left image and a right image, which images are converted into desired video signal components, such as YRGB. Corresponding pixels from the left and right images are compared for each of the video signal components, and plotted as x and y inputs to a Cartesian plot to produce respective two-dimensional (2D) histograms for each video signal component. From the resulting multiple "Diamond" displays, a user may register the respective images and produce color balance between the two images with appropriate camera adjustments, resulting in an improved, high quality stereoscopic video signal, or may determine the quality of an existing stereoscopic video signal. The user may also use the Diamond displays to provide an indication of relative disparity between the two images to facilitate parallax or depth adjustment on certain test charts or scenes.

The objects, advantages and other novel features of the present invention are apparent from the following detailed description when read in conjunction with the appended claims and attached drawing figures.

DETAILED DESCRIPTION OF THE INVENTION

A common method to compare two signal voltages is to plot one as the x and the other as the y value on a Cartesian plot. This is commonly used in cases where the two signals represent orthogonal components of a composite signal, such as used in constellation and color vector displays. However, even when the signals are not such orthogonal components, a Cartesian plot is often used to show common signal dependence, as in the Lissajous display used in stereo audio. In this way the signal amplitudes may be compared and, when the signals are sinusoids, the relative phase and frequency often can be determined.

Figure 1:
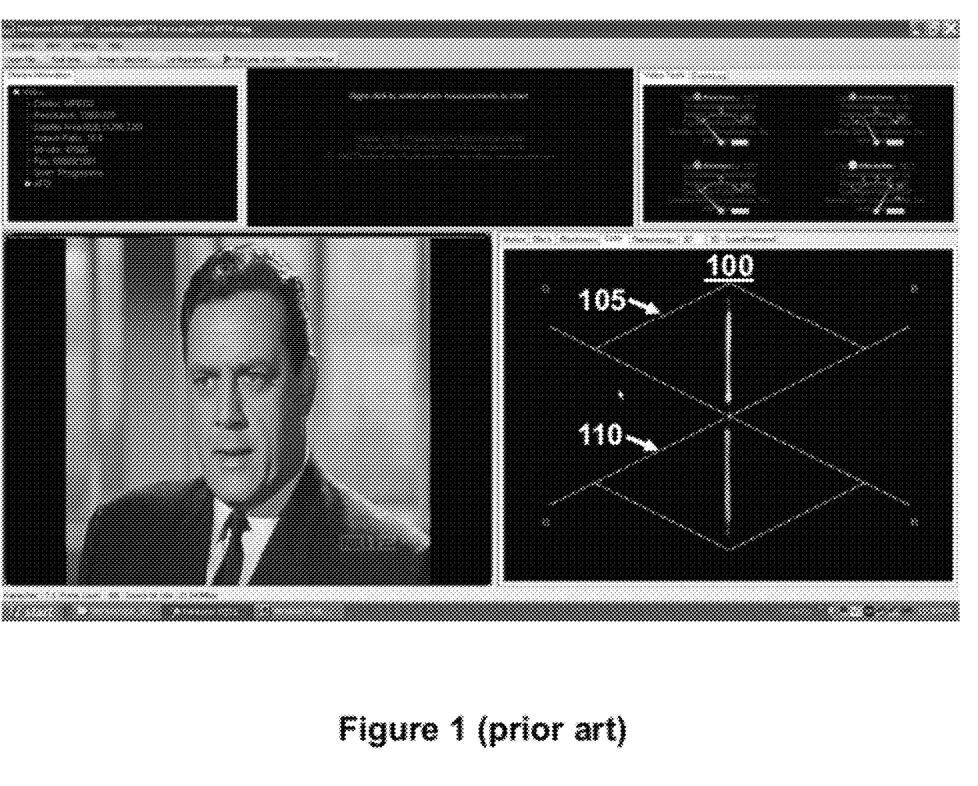
FIG. 1 is a plan view of a two-dimensional video display with a related three-dimensional vector diamond display according to the prior art.

The above-mentioned U.S. Pat. No. 5,307,087, titled "Three-dimensional RGB Component Vector Display,"

which is herein incorporated by reference, describes plotting component RGB video signals pair-wise on x and y axis to produce a so-called "Dual Diamond" display. This display provides an indication of how the signals compare to determine if the levels represent a valid component RGB signal space. This is useful because the R, G, and B components each represent one of the three axes of the three-dimensional (3D) Cartesian color space. A useful feature of a Dual Diamond display is signal matching because, when the x and y components are matched or have the same waveform over time, the Cartesian plot is a straight line no matter what the signal waveform may be. For example, every R, G, and B pixel of an entire frame of a highly detailed image may be compared to determine if at all points R=G=B, thereby representing an ideal monochrome image as shown in FIG. 1.

A Dual Diamond display is often implemented in a raster scanned display memory as a two-dimensional (2D) histogram with one signal creating the x coordinate and the other signal the y coordinate. In this way the intensity of a point on the resulting Cartesian plot is related to the number of times, or bin-count, which a particular bin's x and y coordinate occurs addressed by the two signals. Often a non-linear conversion or limiting of the bin-count to intensity is done to accommodate the large dynamic range of the bin-count relative to typical display intensity. FIG. 1 shows a pair 105, 110 of these 2D histograms. Note that the histograms 105, 110 are rotated 45 degrees to make the line, where the two signals have matching pixels, vertical rather than slanted at 45 degrees.

Now, in one embodiment of the present invention, the corresponding left and right pixels of different color components of a 3D stereoscopic video signal are plotted as 2D histograms.

Figure 2:
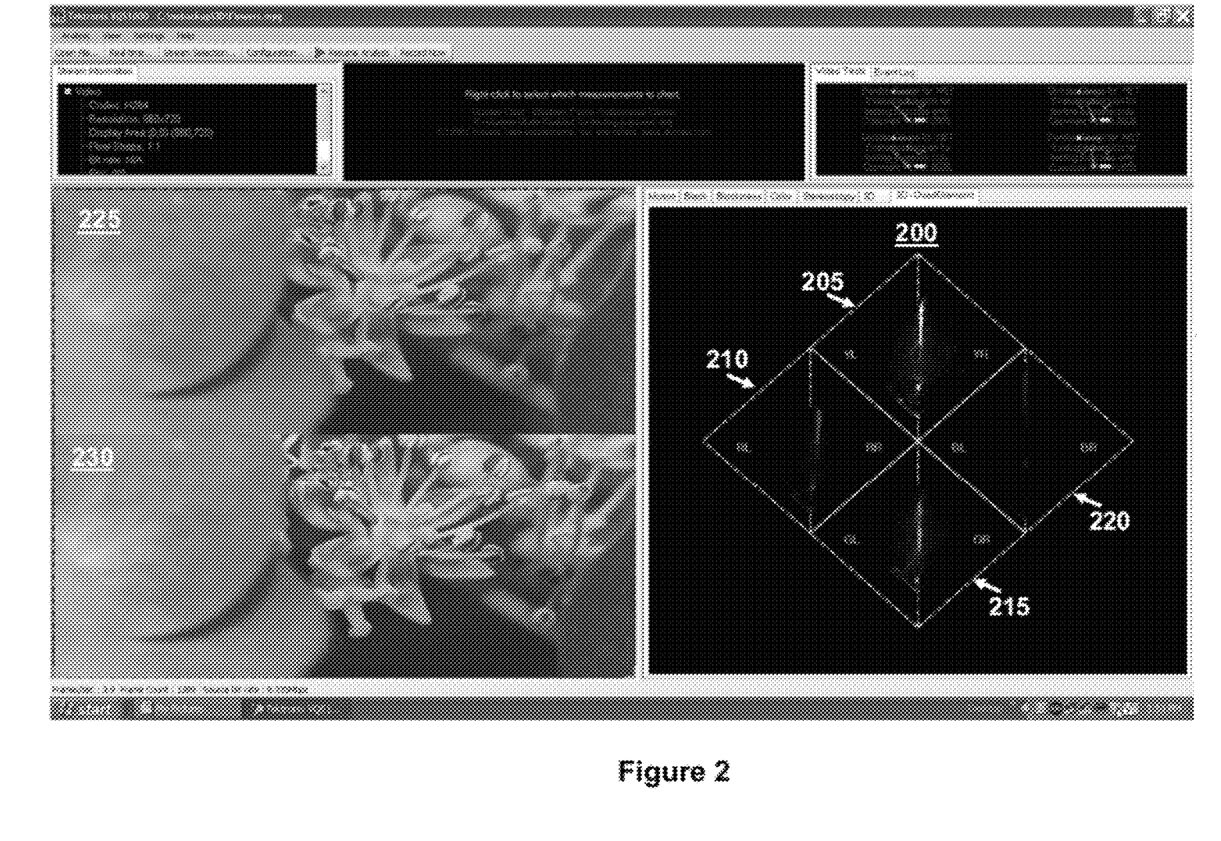
FIG. 2 is a plan view of two two-dimensional video displays that together form a stereoscopic image with a related two-dimensional histogram "quad-diamond" display according to one embodiment of the present invention.

In another embodiment of the present invention, in order to provide the desired stereoscopic image registration and color balance evaluation as discussed above, four 2D histograms are provided to produce a so-called "Quad Diamond" display 200, as shown in FIG. 2. The luminance components, Y_L (Luminance for the Left image) versus Y_R (Luminance for the Right image), form one 2D histogram 205 for comparison and matching of the left and right luminance levels. Also, three more 2D histograms of R_L (Red component from the Left image) versus R_R (Red component from the Right image) 210, G_L (Green component from the Left image) versus G_R (Green component from the Right image) 215, and B_L (Blue component from the Left image) versus B_R (Blue component from the Right image) 200, are used for color matching. Other comparisons may be useful as well, such as Hue_L (Hue from the Left image) versus Hue_R (Hue from the Right image).

In some embodiments of the present invention, the horizontal components of the signals are low-pass filtered, but not the vertical components. This provides localized averages along the horizontal in the left and right images, but no averaging of the vertical detail. In this way any unmatched left and right pixel values (deviation from vertical line) are primarily due to vertical misalignment of the two images rather than horizontal misalignment. This makes the resulting display very sensitive to any undesirable vertical disparity and typically allows the vertical offset to be nullified to less than 1-line.

The horizontal low-pass filter also limits the extent of the histogram disparity, or deviation from a vertical line, due to intentional left and right parallax used to produce the stereoscopic depth, by averaging over larger screen width components, thereby allowing the overall color and luminance mismatch to be more easily compared. A low-pass filter bandwidth in the region of 1 MHz works well for standard definition (SD) stereoscopic video, and a low-pass filter bandwidth in the region of 2 to 5 MHz works well for high definition (HD) stereoscopic video.

FIG. 2 shows an example of a stereoscopic image provided as a stacked image with the left camera image 225 on top and the right camera image 230 on the bottom. In this example the left camera image 225 contains slightly less red than the right camera image 230, so there is a color mismatch. This is seen in the red 2D histogram 210 of the Quad Diamond display 200 as a weighting of the common left and right pixel values (vertical line) toward the right, indicating a bias of more red in the right image. Also note that there is a slight weighting of the luminance (YL versus YR) to the right image as well. Green and Blue matching 215, 220, on the other hand, seem good.

Figure 3:
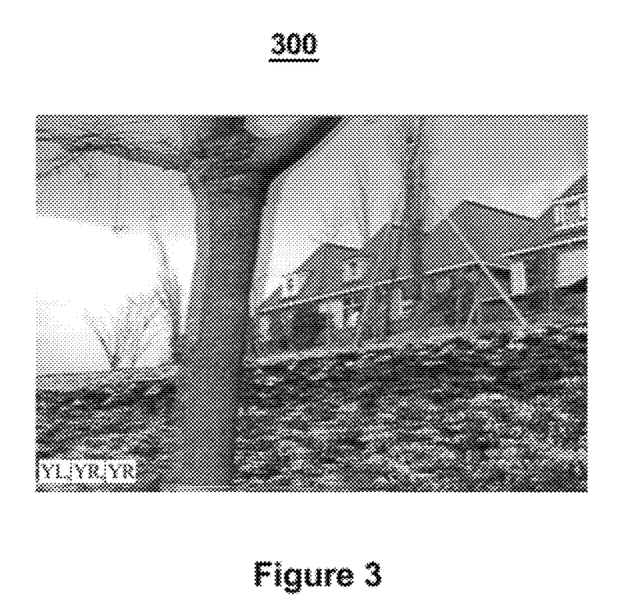
FIG. 3 is a plan view of an anaglyph of two sample luminance frames.
Figure 4:
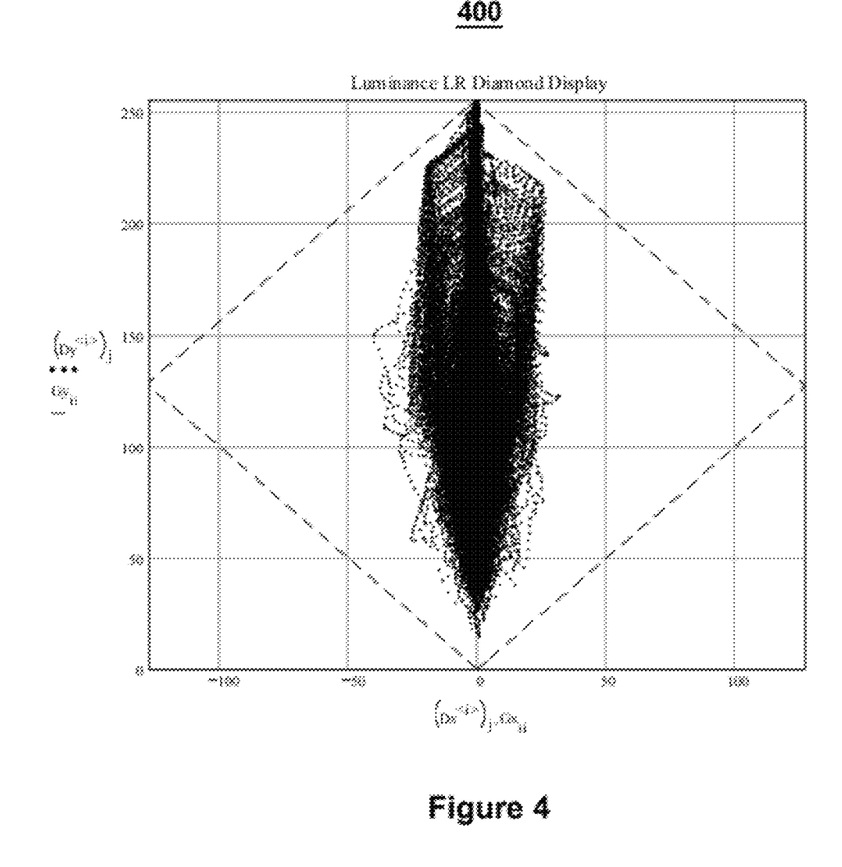
FIG. 4 is a plan view of a diamond display for one color component of the anaglyph of FIG. 3 according to the present invention.

By way of example, FIG. 3 shows an anaglyph 300 of two sample luminance frames, luminance left and right or YL and YR, to be processed. FIG. 4 shows a Cartesian plot 400 of the low-pass filtered and decimated pixels, YLd, and YRd, created from YL and YR, thereby providing a simulation of the 2D histogram described above.

The equations for the y and x axis, Dy and Dx are as follows:

$$Dy := \frac{YLd + YRd}{2} \quad Dx := \frac{YRd - YLd}{2}$$

The result of these equations is to rotate the Cartesian xy plot by 45 degrees, thereby making the pixels that have the same luminance values between left and right appear on the vertical center line. The values of Dy and Dx then are plotted or act as indices into the bins of a 2D histogram, as in the example Quad Diamond display of FIG. 2. For those pixels that do not share the same left and right values due to depth parallax rather than vertical, zoom or rotational alignment error, the horizontal disparity between the images appears as horizontal spreading of the plot around the vertical center line of the diamond plot area. The width of the horizontal spreading is related to the amount of depth parallax, while the skew of the plot away from the vertical shows a level or gain mismatch between the two images.

Using a similar set of equations, the left versus right Diamond displays are created for the left and right Red, Green, Blue, Hue, Value, or other color components of the stereoscopic video signal. Combining four of the Diamond displays representing four components produces the Quad Diamond display of FIG. 2.

Figure 5:
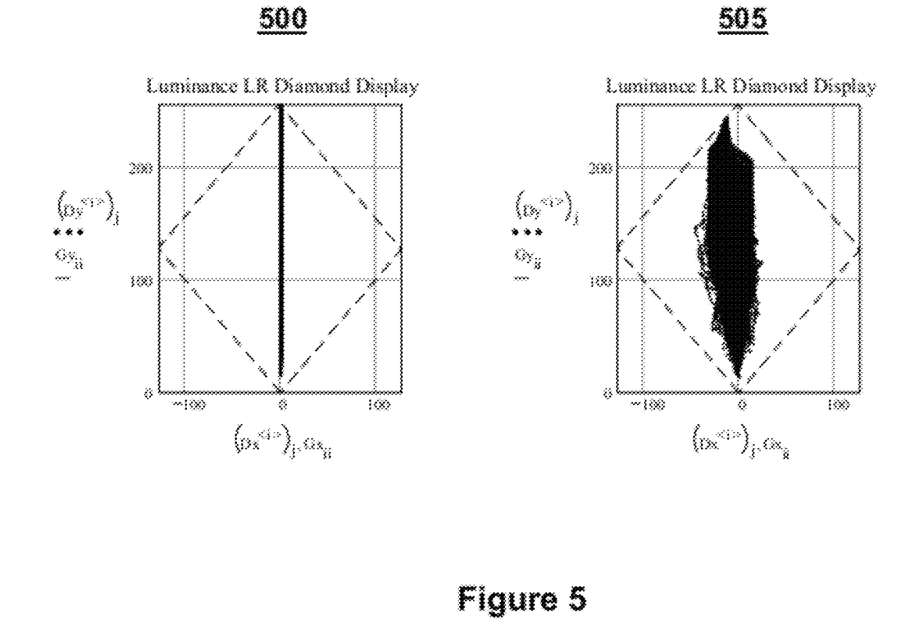
FIG. 5 is a plan view illustrating two examples of the diamond display of FIG. 4 having different camera alignments according to the present invention.

FIG. 5 shows two examples 500, 505 of the Diamond display of FIG. 4 having different camera alignments. The display 500 on the left shows the case where perfect spatial alignment between the two images has been achieved and there is no gain mismatch. This is indicated by the thin vertical line plot and illustrates the ideal stereoscopic camera setup before the parallax angle has been set for stereoscopic depth. The display 505 on the right shows the case where there is some desired horizontal parallax (depth disparity) between the images but there is also an undesired 10% luminance gain or contrast mismatch (left camera is 10% lower than right) due, for example, to camera auto-aperture differences.

Figure 6:
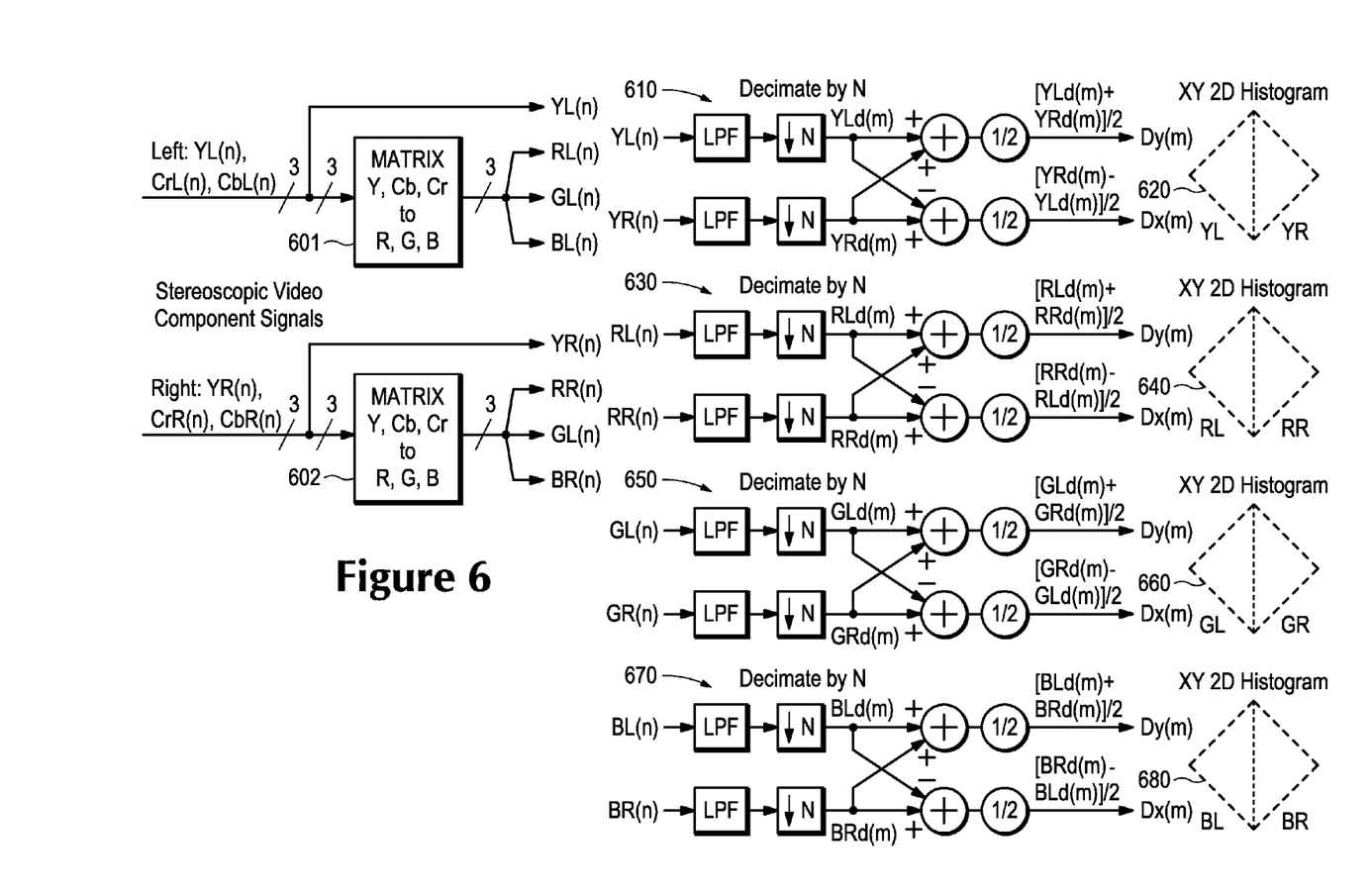
FIG. 6 is a block diagram view of a system for producing the quad-diamond display according to the present invention.

Referring now to FIG. 6, in one embodiment the left component video values (YL, CrL, CbL) from the left stereoscopic camera are input to a left conversion matrix 601, while the right component video values (YR, CrR, CbR) from the right stereoscopic camera are input to a right conversion matrix 602. The respective luminance values YL, YR and the RGB component values (RL, GL, BL and RR, GR, BR) from the conversion matrices 601, 602 are input to respective matching processing paths 610, 630, 650, 670, one for comparing the stereoscopic luminance components YL, YR, one for comparing the stereoscopic red components RL, RR, one for comparing the stereoscopic green components GL, GR, and the last one for comparing the stereoscopic blue components BL, BR. Each path 610, 630, 650, 670 has, in this example, a low-pass filter for each of the two input stereoscopic components followed by a sample-rate decimator to produce horizontal line filtering without unnecessary oversampling. The resulting decimated values from the decimators are then added together and subtracted together by a respective adder and subtractor, and the results are averaged by following one-half dividers. The results at the output of each of the processing paths are input to respective x and y inputs of a Cartesian plot to produce the respective 2D histograms 620, 640, 660, 680 for display, as discussed above. The result is the Quad Diamond display as shown in FIG. 2.

Although the above discussion relates principally to camera adjustment to produce a quality stereoscopic video signal, it is readily apparent that the described invention may also be used to analyze the quality of a received stereoscopic video signal.

Thus, the present invention provides a simple indication of left and right image registration for camera setup as well as signal level and color matching on live 3D video material. In cases where one of the images is reversed by a mirror, the pixels would be un-reversed as applied to the invention. Although the present invention is primarily intended for stereoscopic video image production, it also has value for quality control of 3D stereoscopic video signals that may need color correction.

What is claimed is:

1. A method of generating a stereoscopic image registration and color balance evaluation display comprising the steps of:
    receiving a stereoscopic video signal, the stereoscopic video signal comprising a left image and a right image, the left image comprising left pixels and the right image comprising right pixels;
    generating, in a memory, a two-dimensional histogram representing a particular video component of the stereoscopic video signal, by
        generating for the left and right pixels the particular video component,
        comparing the left and right pixels in the particular video component to produce sum and difference values, and
        using the sum and difference values as a pair of indices into two respective sets of bins along two respective axes of the two-dimensional histogram, in which a plurality of bin-counts are stored in the memory, each bin-count corresponding to a particular ordered pair of indices; and
    presenting the resulting two-dimensional histogram from the memory on a display screen.

2. The method as recited in claim 1 further comprising the step of low-pass filtering the left and right pixels in a horizontal direction to produce localized averages of the left and right pixels prior to the generating step.

3. The method as recited in claim 1 further comprising the step of low-pass filtering the particular video component prior to the comparing step.

4. The method as recited in claim 1 wherein the particular video component is selected from the group consisting of luminance, red, blue, green, hue and value.

5. The method as recited in claim 1 wherein the generating step comprises the step of generating a plurality of two-dimensional histograms representing a corresponding plurality of different video components of the stereoscopic video signal and wherein the displaying step comprises the step of displaying the plurality of two-dimensional histograms.

6. An apparatus for use in analyzing a stereoscopic video signal comprising:
    a plot generator structured to generate a Cartesian plot from a particular color component of the stereoscopic video signal, the plot generator having as inputs left image pixels and corresponding right image pixels for the particular color component to produce a two-dimensional histogram by using sum and difference values of the corresponding left image pixels and right image pixels as indices into bins along two axes of the two-dimensional histogram; and
    a display screen for presenting the two-dimensional histogram to provide a viewer with an indication of how well matched the particular color component for the left and right images are.

7. The apparatus as recited in claim 6 wherein the particular color component is selected from the group consisting of luminance, red, blue, green, hue and value.

8. The apparatus as recited in claim 6 wherein the plot generator is structured to generate a plurality of Cartesian plots from a plurality of different color components of the stereoscopic video signal, each Cartesian plot representing a different one of the different color components in the form of a two-dimensional histogram, the two-dimensional histograms being displayed simultaneously on the display screen.

9. The method as recited in claim 5 wherein the plurality of different video components comprise a luminance component, a red component, a blue component and a green component.

10. The method as recited in claim 9 wherein the plurality of two-dimensional histograms are presented as a Quad Diamond display.

11. An apparatus for use in analyzing a stereoscopic video signal comprising:
    a plot generator structured to generate a Cartesian plot from a particular color component of the stereoscopic video signal, the plot generator having as inputs left image pixels and corresponding right image pixels for the particular color component to produce a two-dimensional histogram; and
    a display screen for presenting the two-dimensional histogram to provide a viewer with an indication of how well matched the particular color component for the left and right images are,
    wherein the plot generator is structured to generate a plurality of Cartesian plots from a plurality of different color components of the stereoscopic video signal, each Cartesian plot representing a different one of the different color components in the form of a two-dimensional histogram, the two-dimensional histograms being displayed simultaneously on the display screen, and
    wherein the different color components are luminance, red, green and blue and the two-dimensional histograms are presented on the display screen as a Quad Diamond display.

12. The method as recited in claim 1 in which presenting the resulting two-dimensional histogram on a display screen comprises presenting the resulting two-dimensional histogram on a display screen of a test and measurement device.

13. The method as recited in claim 1 in which a bin-count in the plurality of stored bin-counts is incremented when the sum and difference values of the corresponding pair of left and right pixels in the particular video component match the particular ordered pair of indices corresponding to the bin-count.

14. The method as recited in claim 13 in which a bin-count value is represented during the displaying step as an intensity.

15. The method as recited in claim 13 in which a bin-count value is represented during the displaying step as a color.

16. The method as recited in claim 13 further comprising:
   resetting the plurality of stored bin-counts to zero before repeating the generating step and the displaying step for a second pair of left and right images in the stereoscopic video signal.

\* \* \* \* \*